US008112368B2

(12) United States Patent
Eklund et al.

(10) Patent No.: US 8,112,368 B2
(45) Date of Patent: Feb. 7, 2012

(54) METHOD, APPARATUS AND COMPUTER PROGRAM PRODUCT FOR PREDICTING A FAULT UTILIZING MULTI-RESOLUTION CLASSIFIER FUSION

(75) Inventors: Neil H. Eklund, Schenectady, NY (US); Xiao Hu, Schenectady, NY (US)

(73) Assignee: The Boeing Company, Chicago, IL (US)

( * ) Notice: Subject to any disclaimer, the term of this patent is extended or adjusted under 35 U.S.C. 154(b) by 844 days.

(21) Appl. No.: 12/045,408

(22) Filed: Mar. 10, 2008

(65) Prior Publication Data

US 2009/0228409 A1 Sep. 10, 2009

(51) Int. Cl.
*G06F 15/18* (2006.01)
*G06N 3/00* (2006.01)

(52) U.S. Cl. ............. 706/12; 702/136; 703/22; 382/159

(58) Field of Classification Search .................. None
See application file for complete search history.

(56) References Cited

U.S. PATENT DOCUMENTS

2003/0014692 A1* 1/2003 James et al. .................... 714/25
2008/0166014 A1* 7/2008 Marcus et al. ................. 382/103

OTHER PUBLICATIONS

Leo Breiman, Bagging Predictors, *Technical Report 421*, Sep. 1994, pp. 1-19, Department of Statistics, University of California, Berkeley, California 94720.

Leo Breiman, Random Forests, *Machine Learning 45*, 2001, pp. 5-32, Kluwer Academic Publishers, Manufactured in the Netherlands.

Isabelle Guyon, Andre Elisseeff, An Introduction to Variable and Feature Selection, *Journal of Machine Learning Research 3*, 2003, pp. 1157-1182.

Xiao Hu, Kai Goebel, A Data Fusion Approach for Aircraft Engine Fault Diagnostics, *Proceedings of ASME Turbo Expo 2007*, May 14-17, 2007, pp. 1-9, ASEM Turbo Expo Congress & Exhibition, Montreal, Canada.

Neil H.W. Eklund, Xiao Hu, Real-Time Fault Prediction and Avoidance for Aircraft Engines, *Proceedings of 2007 IEEE Three Rivers Workshop on Soft Computing in Industrial Applications (SMCia/07)*, Aug. 1-3, 2007, 6 pages, Passau, Germany.

* cited by examiner

*Primary Examiner* — Omar Fernandez Rivas
*Assistant Examiner* — Kalpana Bharadwaj
(74) *Attorney, Agent, or Firm* — Alston & Bird LLP

(57) ABSTRACT

A method, apparatus and computer program product are provided to predict faults. Initially, a plurality of features are provided to a plurality of models. A subset of features is selected for each model. The plurality of features selected by a respective model is dependent upon a time scale associated with a respective model. As a result of their dependence upon different time scales, the plurality of selected features provided to a first model will differ from those provided to a second model. The plurality of models process the respective plurality of selected features. The outputs from the plurality of models are fused to generate a measure indicative of an impending fault. By providing different selected features to the models that are dependent upon the associated time scales and by then combining the outputs of the plurality of models, the resulting measure of an impending fault may accurately predict a fault well in advance of its occurrence.

30 Claims, 5 Drawing Sheets

METHOD, APPARATUS AND COMPUTER PROGRAM PRODUCT FOR PREDICTING A FAULT UTILIZING MULTI-RESOLUTION CLASSIFIER FUSION

FIELD OF THE INVENTION

Embodiments of the present invention relate generally to the prediction of a fault and, more particularly, to the prediction of a fault utilizing the fused output of a plurality of models associated with different respective time scales.

BACKGROUND OF THE INVENTION

The prediction of faults that will occur in a system or other piece of equipment is valuable for operational, maintenance, financial and other purposes. For example, the accurate and timely prediction of aircraft engine faults assists with the maintenance of the engine and, in turn, the ability of the aircraft to remain in an operational state. In this regard, the prediction of a fault in advance of its occurrence is useful since the prediction of a fault, particularly well prior to its occurrence, increases the likelihood that maintenance activities can be scheduled at convenient times and can avoid the actual occurrence of the fault which could take the equipment out of service for some period of time and may, in some instances, cause secondary damage to other parts.

A variety of techniques have been developed to predict an impending fault within a system. For example, diagnostic models have been constructed utilizing parametric sensor data to predict an impending fault. With respect to an aircraft, the parametric data may include both raw sensor measurements from the engine or airframe as well as sensor readings that have been corrected to account for flight conditions, such as altitude, ambient temperature, etc. In conjunction with an aircraft engine, for example, the parametric data may include the exhaust gas temperature, fuel flow, engine oil pressure and engine core speed. While parametric data may be useful to predict an impending fault, parametric data can be voluminous and relatively inefficient to compress such that commercial aircraft generally preserve only a few snapshots of parametric data at different intervals during a flight, e.g., takeoff, cruise, and descent.

Other fault prediction techniques have relied upon non-parametric data, such as the data generated in response to built-in tests that produce error log messages. For example, non-parametric error logs can be maintained which indicate when parametric measurements are beyond predefined thresholds, when certain demanded actuator positions are not reached or, more generally, when a certain subsystem behaves outside of predefined operating parameters. The resulting non-parametric error logs are a collection of binary flags which can efficiently be compressed, and so are often recorded for the duration of a flight for later analysis. Thus, the nonparametric data provide insight into the system status over an entire operational cycle, such as over an entire flight, as opposed to only at certain intervals.

With respect to aircraft, the parametric data and non-parametric data have typically been evaluated independent of one another. While such independent evaluation provides some useful information in regard to the prediction of faults within a system, the evaluation of each type of data may sometimes be limited. As such, a technique for predicting faults within an aircraft engine has been proposed in which both parametric data and non-parametric data are combined. In this regard, the non-parametric data may transformed into parametric data in a variety of manners including message decaying and cumulative index techniques as described by Neil Eklund, et al., "A Data Fusion Approach for Aircraft Engine Fault Diagnostics," Proceedings of ASME Turbo Expo 2007, GT2007-27941 (May 2007). These transformed non-parametric data may then be integrated with the parametric data for analysis by traditional methods. As such, the resulting diagnostic model can have the benefit of both the parametric and non-parametric data which may be beneficial to the prediction of impending faults in a reliable manner with fewer false alarms than if either the parametric or nonparametric data were considered alone.

While the combination of the parametric data and the non-parametric data may provide improvements in regard to the prediction of an impending fault, it would still be desirable to further improve upon the techniques for predicting faults in an accurate and reliable manner. In this regard, it is certainly desirable to reduce the instances in which a fault occurs without any advance warning. With respect to aircraft, for example, it would be desirable to not only improve upon the techniques for predicting faults so as to reduce the instances in which equipment fails without warning, but also to improve upon the timing with which those faults are detected since significant operational, maintenance and financial issues may be created if the faults are detected only slightly before the occurrence of the fault, or not detected until the fault has manifested, as opposed to the detection of a fault well in advance of its occurrence. In this regard, the prediction of an imminent fault may cause maintenance actions to be taken immediately, thereby potentially causing service disruptions, such as delayed or cancelled flights, and possibly increasing the cost of the maintenance activity since the labor, spares and shop time will need to be quickly allocated. Conversely, if a fault can be detected well prior to its occurrence, the necessary maintenance actions can be scheduled, thereby potentially reducing the cost of the maintenance, permitting the maintenance to be performed when the aircraft is not otherwise scheduled to be in service, and ensuring the resources required for the service—such as parts, mechanics, and service bays—are available. Accordingly, it would be desirable to not only improve upon the techniques for predicting faults in an accurate and reliable manner, but also to permit faults to be predicted further in advance of the occurrence of the faults such that appropriate maintenance activities can be scheduled in an efficient and economic manner.

BRIEF SUMMARY OF THE INVENTION

A method, apparatus and computer program product are therefor provided in accordance with embodiments of the present invention to improve the prediction of faults, both in terms of the accuracy and the timing with which faults are predicted. By improving the accuracy associated with a prediction of a fault, the confidence in the results of the method, apparatus and computer program product of embodiments of the present invention will be enhanced. Moreover, by reliably predicting faults further in advance of the occurrence of the faults, the method, apparatus and computer program product of embodiments of the present invention permit maintenance activities to be scheduled and performed in a manner that may be more economic and efficient.

In accordance with one embodiment, a method of predicting a fault provides a plurality of extracted features to a plurality of models. The plurality of extracted features are selected through whatever means is dependant upon a time scale associated with a respective model. As a result of their dependence upon different time scales, the plurality of selected features provided to a first model may differ from the plurality of selected features provided to a second model. The plurality of models then process the respective plurality of selected features. The outputs from the plurality of models are then fused to generate a measure indicative of an impending fault. By providing different training data to the models that is dependent upon the time scale associated with the respective models, tuning the feature selection process on the basis of that different data, and by then combining the outputs of the plurality of models, the resulting measure of an impending fault may more accurately predict a fault well in advance of its occurrence.

In this regard, the selected features used by one model may be those features that are most indicative of an imminent fault which will occur well in the future, while the selected features used by another model may be those features that are indicative of an imminent fault. By combining the results of each model, the resulting measure may be more robust in that it includes both the results of a model tuned to detect faults well in advance of their occurrence, as well as the results of a model tuned to predict relatively imminent faults.

The plurality of models may include a number of different types of mathematical models, such as a random forest model, a generalized regression neural network or a logistic regression model. Alternatively, a common mathematical model may be utilized, with the common mathematical model being trained with different data and/or features to generate the plurality of models. For example, a first model may be generated as a result of training the common mathematical model with data that is indicative of a fault that will occur well in the future, while a second model is generated by training the same common mathematical model with data that is indicative of a more imminent fault. In other words, the common mathematical model may be trained with data from the different time scales to generate the plurality of models associated with different respective time scales.

Even within a single time scale, a plurality of models associated with the common time scale may be provided. A plurality of selected features may then be provided to each of the plurality of models associated with the common time scale, and the results of the models associated with the common time scale may be fused, both with one another and with the outputs of models associated with other time scales. Additionally or alternatively, the plurality of selected features may be provided to the plurality of models such that a different plurality of selected features are provided to each of the models. Thus, a first set of selected features may be provided to a first model, and a second set of selected features may be provided to a second model, with both the first and second models being associated with the same time scale. As before, the results of each of the models would then be fused, both with one another and with the outputs of the models associated with other time scales.

In accordance with other embodiments of the present invention, an apparatus and a computer program product for predicting a fault are also provided which provide a plurality of features to a plurality of models, perform feature selection to identify a subset of selected features in a manner that is dependent upon the time scale associated with the respective model, process the respective plurality of selected features with the plurality of models and fuse the outputs from the plurality of models to generate a measure indicative of the impending fault, as described above. In regard to the apparatus, the apparatus may include a processing element configured to perform these various functions. With respect to the computer program product, the computer program product may include at least one computer-readable storage medium having computer-readable program code portions stored therein with the computer-readable program code portions including executable portions for performing these various functions.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
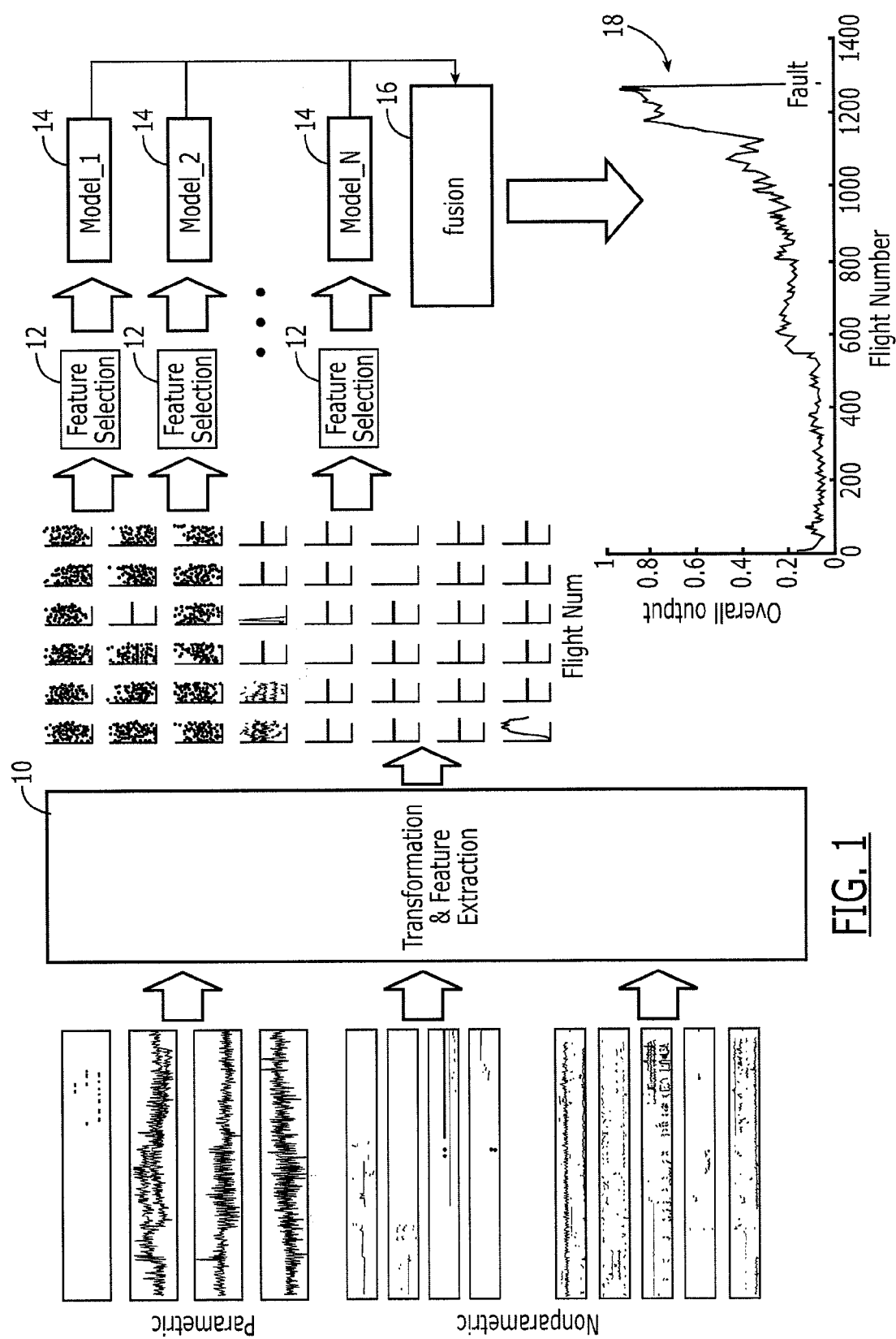
FIG. 1 is a schematic illustration of the operations performed in accordance with one embodiment of the present invention.

Referring now to FIG. 1 the operations for predicting a fault in accordance with one embodiment of the present invention are depicted. While the method, apparatus and computer program product of the present invention may be utilized to predict faults in various types of systems, the method, apparatus and computer program product will be described in conjunction with the prediction of a fault in an aircraft engine by way of example, but not limitation.

As shown in FIG. 1, data is initially provided and will be utilized to determine if a fault is likely to occur. While various types of data may be provided including either parametric data or non-parametric data, both parametric data and non-parametric data may be provided and used in combination with one another in order to potentially improve the accuracy and reliability of the resulting prediction. With respect to an aircraft engine, the parametric data may include direct measurements from sensors on the engine and/or sensor readings that have been adjusted to compensate for the flight conditions, such as altitude, ambient temperature, etc. As noted above, examples of the parametric data are exhaust gas temperature, fuel flow, engine oil pressure and engine core speed. For commercial aircraft engines the parametric data is generally collected from the sensors within one or more predefined intervals (e.g., takeoff, cruise, and descent) during the operational period of the aircraft engine. The parametric data may be collected in other intervals or in other instances. For example, parametric data may be collected on a continuous basis, typically at a relatively high frequency, in conjunction with military aircraft engines, ground based turbines and the like.

As shown in FIG. 1, non-parametric data may also be provided. The non-parametric data may be provided by various subsystems or other equipment. In the context of an aircraft engine, for example, non-parametric data may be provided by a full authority digital engine control (FADEC) system and from other subsystems on the airframe which are typically stored by the centralized maintenance computer (CMC). A wide variety of non-parametric data may be provided including, but not limited to, non-parametric data that represents the results of built-in tests, non-parametric data that indicates instances in which parametric measurements are beyond certain thresholds, non-parametric data that indicate when demanded actuator positions are not reached or are not reached within a predefined time or non-parametric data that indicates when the subsystem or other piece of equipment behaves outside of predefined operating parameters.

In order to effectively process the data to predict a fault, the parametric and non-parametric data may be transformed and subjected to a feature extraction process 10. The type of transformation and feature extraction will be dependent, in part, upon the type and form of the data, but a wide variety of suitable transformation and feature extraction processes are known to those skilled in the art. With respect to parametric data, for example, the transformation and feature extraction processes may initially remove outliers from the data and the remaining data may then be smoothed, such as by use of an exponentially weighted moving average time series filter. With respect to the non-parametric data, the non-parametric data may initially be transformed into parametric data to facilitate subsequent processing. The non-parametric data may be transformed into parametric data in a variety of manners including message decaying and cumulative index techniques as described by Neil Eklund, et al., "A Data Fusion Approach for Aircraft Engine Fault Diagnostics," Proceedings of ASME Turbo Expo 2007, GT2007-27941 (May 2007). Alternatively, or additionally, either or both the non-parametric and parametric data may be used without transformation.

Following transformation and feature extraction, the data may be represented graphically as shown in FIG. 1 in which each graph is associated with a respective type of data with the value of the data depicted over the course of a number of flights, such as 1275 flights in the illustrated embodiment. In accordance with embodiments of the present invention, a subset of features is then selected from among the plurality of features. As shown at element 12 in FIG. 1, a plurality of sets of features is selected with each set providing input to a respective model 14. Each model is, in turn, associated with a time scale. As such, the features selected for input to a respective model are advantageously selected to include those features that are generally most meaningful or determinative during the respective time scale of an impending fault from among the features available during the time scale associated with the respective model.

Figure 2:
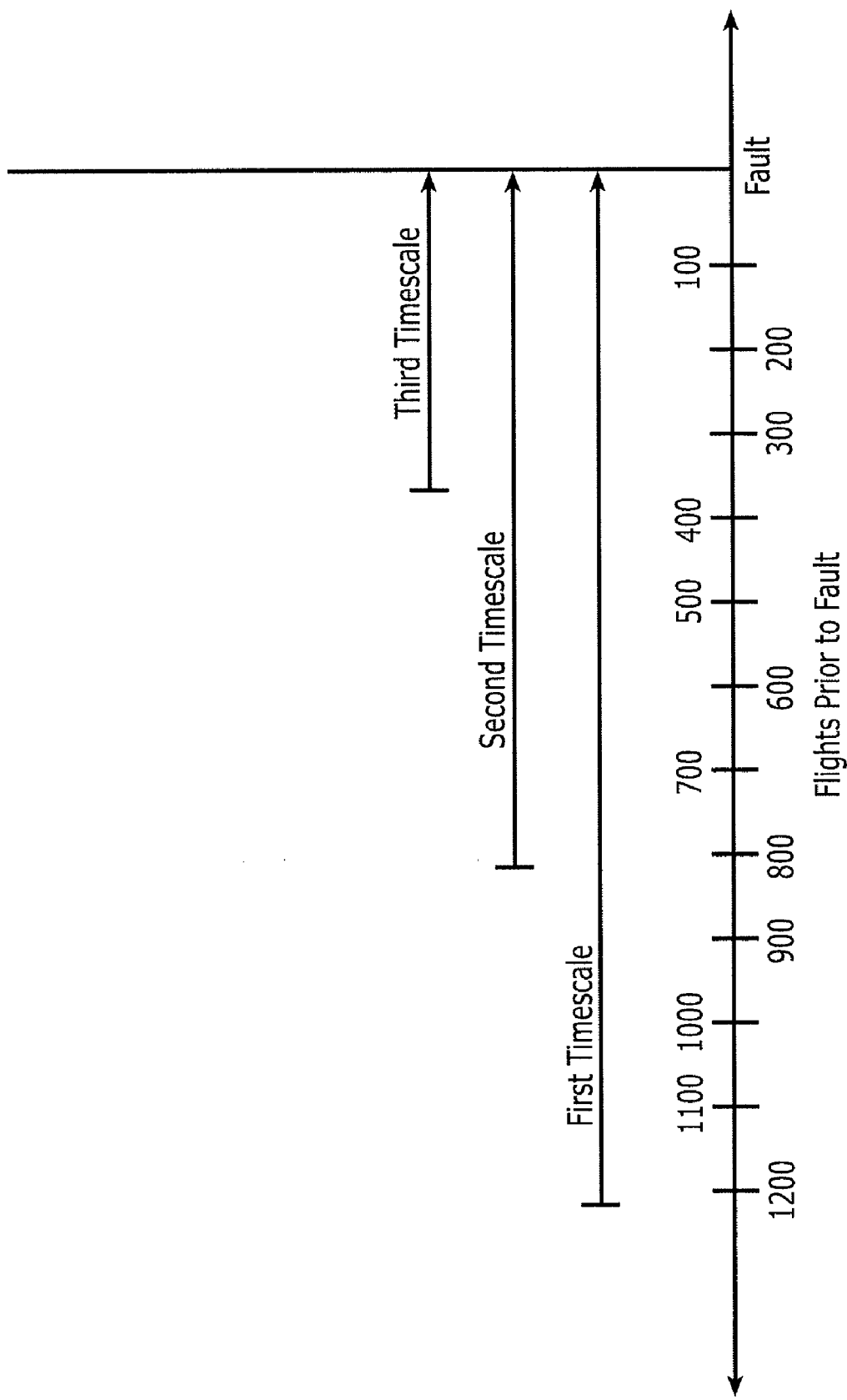
FIG. 2 is a graphical representation of three different time scales with which three models are respectively associated in accordance with one embodiment of the present invention.

As shown in conjunction with FIG. 2, an aircraft engine is anticipated to operate with faults occurring in one or more components of the aircraft engine following a number of flights. In order to provide for improved prediction of faults, each model may be associated with a respective time scale. In the relatively simple embodiment depicted in FIG. 2, a first model may be associated with a first time scale, such as the time scale associated with flights which occur 0-1200 flights prior to the occurrence of a fault, a second model may be associated with a second time scale, such as data associated with flights which occur 0-800 flights prior to the occurrence of a fault and a third model may be associated with a third set of flights, such as the last 400 flights prior to the occurrence of a fault. Although there are equally sized steps (i.e., 400 flights) between the time scales associated with the models of the embodiment of FIG. 2, the time scales associated with the models may have unequally sized steps between or may otherwise differ from those depicted in FIG. 2. While each time scale begins at a different point in time, however, each time scale generally extends until the occurrence of the fault. Additionally, while the time scales of FIG. 2 are in terms of the number of flights, the time scales may be defined in other measures of time, such as years, days, hours, cycles, equivalent cycles, total accumulated cycles, or the like, with the particular measure of time and the step size between the particular time scales, e.g., long range, mid range and short range, depending upon the application.

Based on the association of the models with respective time scales, the features that are selected by each respective model are advantageously selected to include those features which are generally most predictive during the respective time scale of an impending fault. In this regard, it should be understood that certain features which are indicative of a fault may be best recognized, e.g., most distinctive, when considered over a longer period of time, such as provided by the long range time scale, while other features which are indicative of a fault are more apparent when considered over an intermediate period of time, such as provided by a mid range time scale, or over a shorter period of time that immediately precedes the occurrence of a fault, such as provided by the short range time scale. As such, a subset of features which includes at least those features that may be most indicative of an impending fault when considered by the first model over a longer period of time prior to a fault should be selected for provision to the first model associated with the first time scale. Conversely, other features which are more predictive of an impending fault and which are, therefore, more apparent when considered over a shorter period of time before the occurrence of a fault should be selected for provision to the third model associated with the third time scale. These features provide a shorter range forecast of an impending fault and may be entirely different features from these selected during the first time scale for their longer range forecasting ability. Alternatively, some of the features selected may be in common between the two sets of features with only some of the selected features differing between the two time scales. In any event, the features selected during the third time scale and provided to the third model advantageously include those features which provide a meaningful short-term forecast of an impending fault and may differ from the features selected for provision to other models associated with other time scales. Although the selection of features for three time scales have been described above, the same process is employed for selecting the features during each time scale which provide the most meaningful information during the respective time scale of an impending fault at some future point in time. The selected features for a respective time scale are then provided to the model that is also associated with the respective time scale for processing as described below.

As described above, a plurality of features are generated by the feature transformation and extraction process 10. Each of these features is then available to be selected, via either an automated or manual process, for consideration by the respective models 14 during any or all of the different time scales. In this regard, the feature sets which are selected for consideration in conjunction with each time scale are normally those features which provide the most useful information to the respective model for fault prediction purposes over the length of time in advance of the fault that is associated with the respective time scale. As such, the feature sets selected for consideration in conjunction with each time scale may be disjoint from one another, may be the same as one another or may be a mixture with some common features and some different features.

In this regard, features are extracted such that some are expected to be beneficial for predicting faults over a longer time interval, and others are expected to be beneficial for predicting faults over only a very short time interval. The features are extracted from data associated with both normal and faulty operation of equipment. As noted above, different models get different time scales of data with some models getting data over a very short interval before the fault, while other models get data over longer intervals. Generally, all time scales end with the occurrence of the fault. It is known to those skilled in the art as exemplified by the machine learning literature that for a given problem, the universe of possible features is not the optimal feature set to train a classifier on for a particular data set; rather, some subset is generally optimal. In one embodiment, each model may be assigned by hand a subset of features from the full set that an expert thinks would be valuable to detecting faults at the time scale associated with the model. Alternatively, and more typically, one or more of the well known machine learning, statistical, or other algorithmic feature selection process(es) are applied to select a subset of features that maximizes the performance of a particular classifier at a particular time scale dependant upon the data used for training the model. Alternatively, for example when the output of multiple models at the same time scale is to be combined, features may be assigned by hand or using some algorithmic process to promote diversity in the output of multiple models at a particular time scale. Alternatively, in any situation, features may be assigned both by hand and using an algorithmic process. In one embodiment, the process of selecting features for the respective models and then training the models with data representative of the selected features may be performed iteratively. In this regard, a plurality of features may be selected for each of models and the models may then be trained with data representative of the selected features. The performance of the models may then be evaluated, such as based upon a comparison of the performance of the models to an actual outcome. The process of selecting features and then training the models may then be repeated upon the performance of the models is satisfactory.

As described above, the method, apparatus and computer program product employ a plurality of models 14, each associated with a respective time scale. Each model generally analyzes a plurality of features, that is, the selected features provided to the model, in order to classify the features as either normal, i.e., no impending fault, or abnormal, i.e., indicative of an impending fault. As such, the models may also be termed classifiers as a result of the manner in which the models endeavor to optimally partition the feature space into regions containing different classes, that is, normal and abnormal. Different types of models have been developed including a random forest classification method that applies bagging to a variation of classification trees. See, L. Breiman, "Random Forest", *Machine Learning*, 45(1), pages 5-32 (2001). Other types of models include neural networks, such as generalized regression neural networks, and logistic regression models. See C. M. Bishop, *Neural Networks for Pattern Recognition*, Oxford University Press (1995) and D. W. Hosmer, et al., *Applied Logistic Regression*, John Wiley & Sons, NY (1989). Many other alternative models are known to those skilled in the art and can be alternatively or additionally employed.

Regardless of the type of model that is employed, each model is associated with a respective time scale. In the example provided above in conjunction with FIG. 2, for example, the first model is associated with the first time scale, the second model is associated with the second time scale and the third model is associated with the third time scale. By being associated with a particular time scale, a model has been trained to be responsive to those features, i.e., the respective set of selected features that are most indicative of an impending fault during the respective time period. Thus, the first model would be trained utilizing data sets which include the respective set of selected features which are most indicative during the first time scale of an impending fault, that is, a set of features that are most predictive of a fault when considered over a longer expanse of time. Conversely, the third model of the embodiment described in conjunction with FIG. 2 may be selected and trained with data including the respective set of features selected to be most indicative during the third time scale of an impending fault, that is, a set of features that are most predictive of a fault based upon data occurring only shortly before the occurrence of the fault.

In this regard, each model may be the same type of model, that is, each model may be a random forest model, a generalized regression neural network or a logistic regression model, which has been differently trained to recognize and respond to the respective set of selected features that are most indicative during the respective time scale of an impending fault. Alternatively, different types of models may be utilized. For example, the first model may be a random forest model, the second model may be a generalized regression neural network and the third model may be a logistic regression model. Even in this embodiment, however, each model is still generally trained to recognize and respond to a respective set of selected features that is most indicative during the respective time scale of an impending fault.

In operation, the outputs of the models are then fused as shown at element 16 of FIG. 1. The outputs of the models may be fused in various manners. For example, the outputs from the models may simply be added to one another. Alternatively, the outputs of the models may be fused by treating the output from each model as an intermediate feature space, and using an additional classifier to fuse the individual model output into a single output. Alternatively, the fusion may be done in the decision space derived from the individual classifier using a variety of methods. See L. Kuncheva, *Combining Pattern Classifiers: Methods and Algorithms*, Wiley-Interscience (Jul. 1, 2004) for an overview of such methods.

Figure 3:
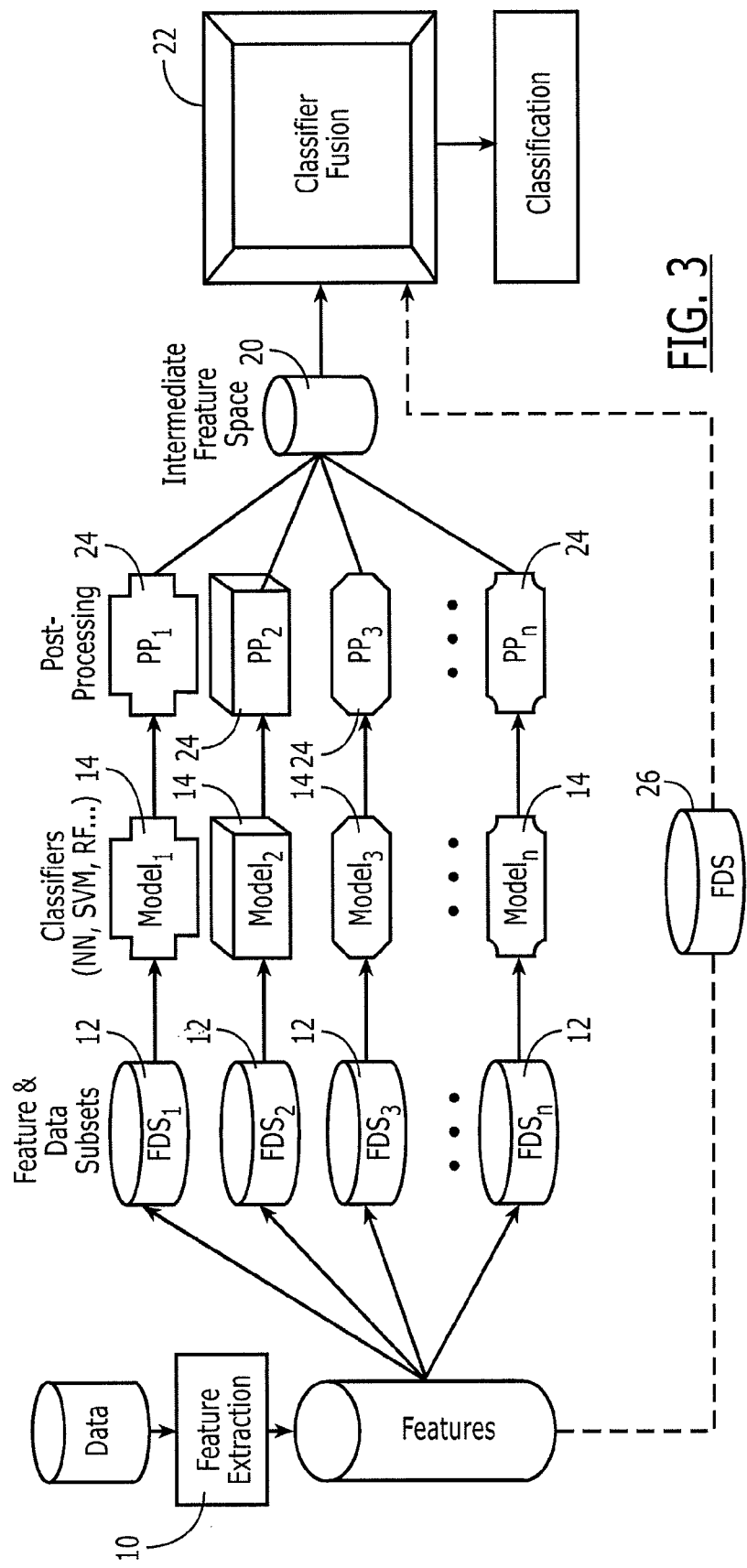
FIG. 3 is a schematic illustration of the operations performed in accordance with another embodiment of the present invention.

As indicated above and as shown in FIG. 3, one embodiment of the present invention combines the outputs from a plurality of models or classifiers 14 into an intermediate feature space 20. An additional model or classifier 22 may then fuse the outputs from the plurality of models 14 into a single output which effectively classifies the data as being either normal, i.e., no impending fault, or abnormal, i.e., indicative of an impending fault. As with the models 14, the additional model or classifier 22 may be any of a variety of different models, such as a random forest model, a generalized regression neural network or a logistic regression model, which has been trained on exemplary output from the models 14 to recognize and appropriately classify impending faults. As shown in FIG. 3, the additional model or classifier 22 may not only analyze the outputs from the models 14, but may also receive one or more selected features 26 following the transformation and feature extraction process 10. Additionally, the embodiment depicted in FIG. 3 may provide for post-processing 24 of the outputs of one or more of the models 14 prior to reliance upon the outputs by the additional model or classifier 22. For example, the range of outputs of the models 14 may be normalized via the post-processing.

Following the fusion of the outputs of the models, the fused output may be utilized to predict an impending fault. Advantageously, the fused output can be utilized to predict an impending fault in advance of its occurrence such that appropriate maintenance activities can be scheduled at a convenient time and location prior to the occurrence of the fault and, as a result, prior to the creation of any secondary damage which may be occasioned by the occurrence of the fault. By associating the models with different time scales and selecting the features provided to the respective models to include those features which are more indicative during the respective time scale of an impending fault, the fused output can provide a reliable prediction of an impending fault which may be provided further in advance of the fault to facilitate scheduling of appropriate maintenance activities. With regard to the graphical representation 18 of the fused output depicted in FIG. 1, an alert may be provided to maintenance personnel as to an impending fault in instances in which the fused output exceeds a predefined threshold.

Figure 4:
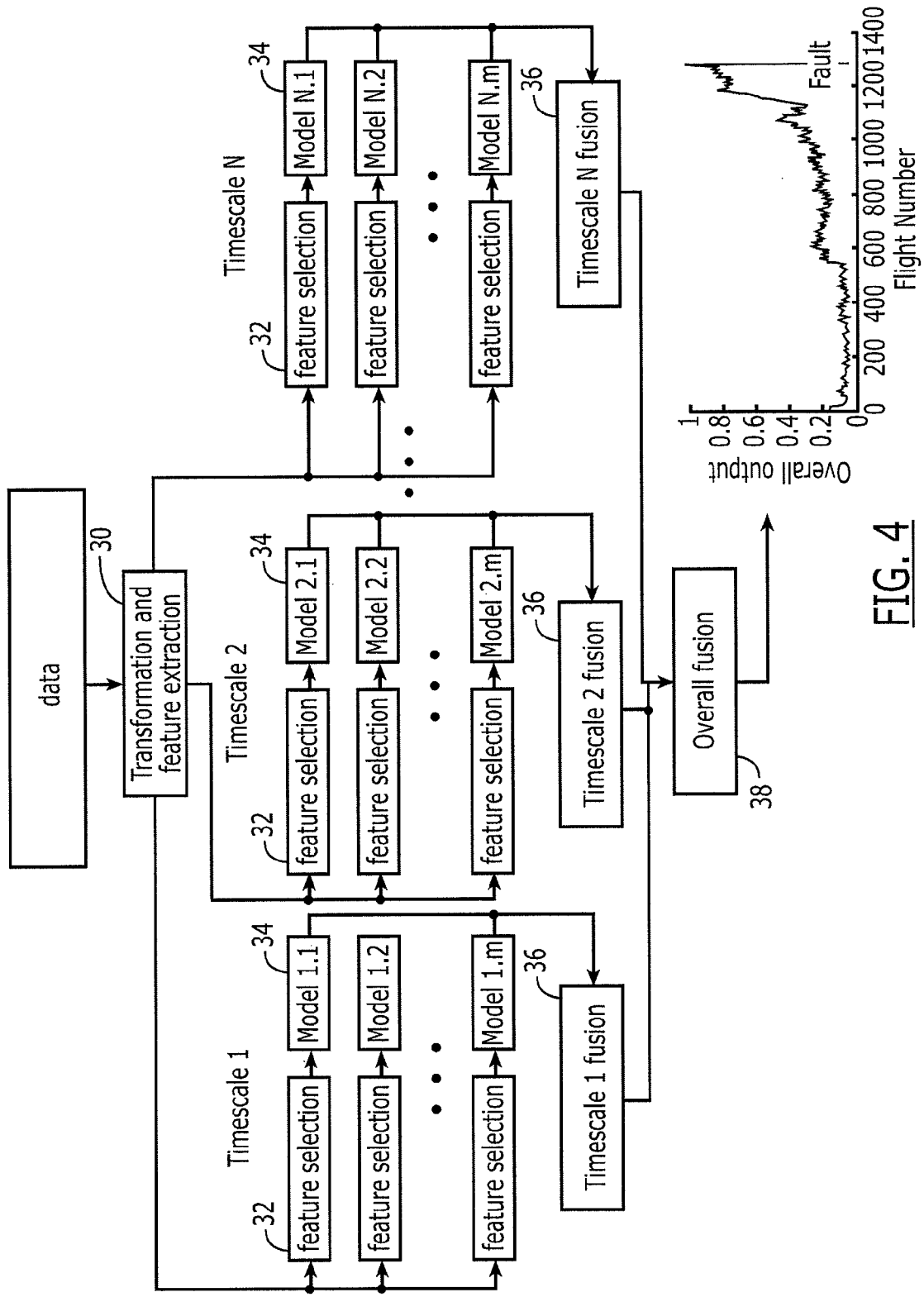
FIG. 4 is a schematic representation of the operations performed in accordance with a further embodiment of the present invention.

While the embodiment depicted in conjunction with FIGS. 1 and 2 includes a single model associated with each time scale, multiple models may be associated with any one or all of the time scales as shown in FIG. 4 in order to possibly further increase the reliability of the resulting fused output in terms of its prediction of an impending fault. As shown in FIG. 4, for example, a plurality of models may be associated with the first time scale, a plurality of models may be associated with the second time scale and a plurality of models may be associated with the $n^{th}$ time scale. As also shown by FIG. 4, a set of selected features is provided to each model within each time scale. For a respective time scale, the plurality of models may all be the same type of model or the plurality of models may include different types of models. In instances of which the plurality of models associated with a respective time scale are the same type of models, different set of selected features are generally provided to each different model. Alternatively, in instances in which the plurality of models associated with the respective time scale are different types of models, either the same or different sets of selected features may be provided to the models. In any event, the features which are selected for provision to the model associated with the respective time scale are advantageously selected to include those features which are most indicative within the respective time scale of an impending fault.

As shown in FIG. 4, following a transformation and feature extraction process 30, the sets of selected features 32 may be provided to the models 34 for classification. The outputs of the models are then fused to provide an overall output as shown in FIG. 4. Although the outputs of the models associated with a respective time scale are illustrated to be fused together as shown at 36 prior to being fused to the outputs of the models associated with the other time scales as shown at 38, the outputs of all the models may alternatively be fused in one fusion operation, if so desired.

Figure 5:
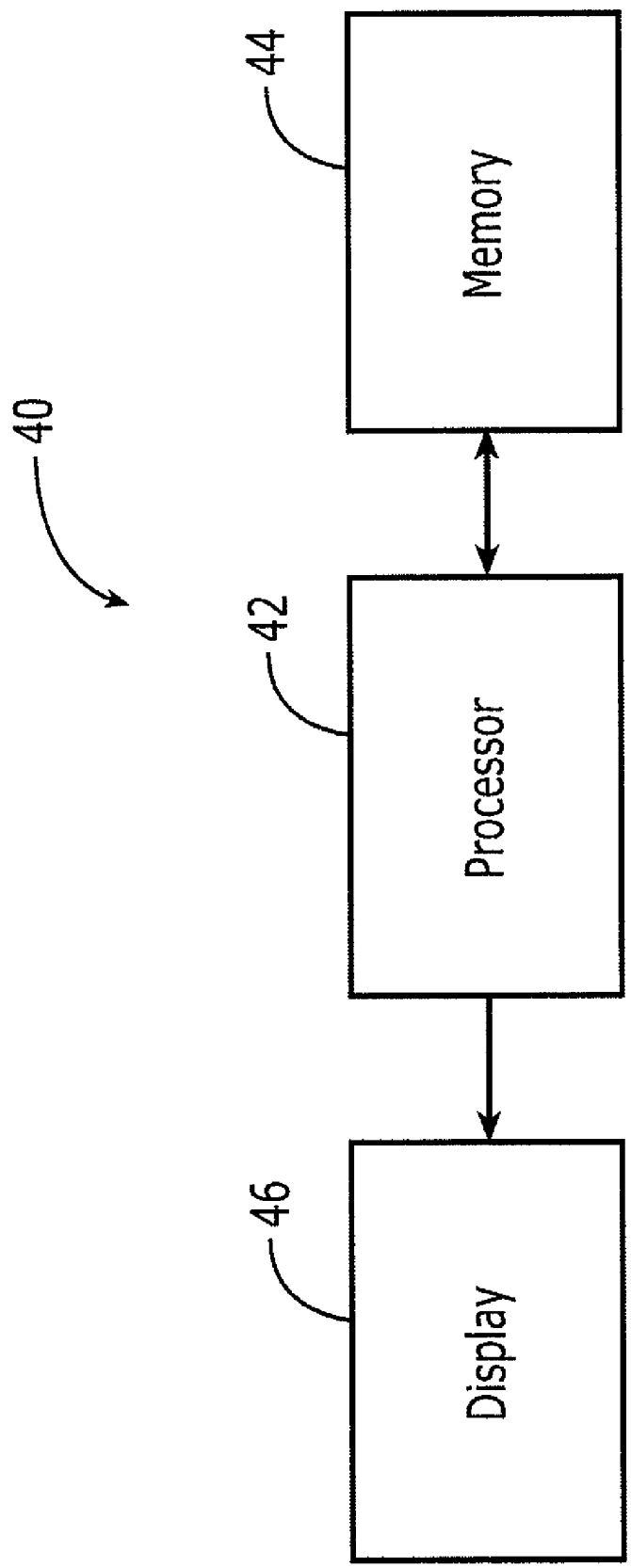
FIG. 5 is a block diagram of an apparatus in accordance with one embodiment of the present invention.

As shown in FIG. 5, the apparatus 40 of embodiments of the present invention is typically embodied by a processing element 42 and an associated memory device 44, both of which are commonly comprised by a computer or the like. In this regard, the method of embodiments of the present invention as set forth generally in FIGS. 1, 3 and 4 can be performed by the processing element executing a computer program instructions stored by the memory device. The memory device may also store the data in some embodiments. The computer can include a display 46 for presenting the image and any other information relative to performing embodiments of the method of the present invention.

The apparatus 40 may operate under control of a computer program product according to another aspect of the present invention. The computer program product for performing the methods of embodiments of the present invention includes a computer-readable storage medium, such as the non-volatile storage medium, e.g., memory device 44, and computer-readable program code portions, such as a series of computer instructions, embodied in the computer-readable storage medium.

In this regard, FIGS. 1, 3 and 4 depict the operations performed by the methods, systems and program products according to exemplary embodiments of the present invention. It will be understood that each operation can be implemented by computer program instructions. These computer program instructions may be loaded onto a computer or other programmable apparatus, e.g., processing element 42, to produce a machine, such that the instructions which execute on the computer or other programmable apparatus create means for implementing the operations illustrated in FIGS. 1, 3 and 4. These computer program instructions may also be stored in a computer-readable memory that can direct a computer or other programmable apparatus to function in a particular manner, such that the instructions stored in the computer-readable memory produce an article of manufacture including instruction means which implement the operations illustrated in FIGS. 1, 3 and 4. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the operations illustrated in FIGS. 1, 3 and 4. It will also be understood that the operations illustrated in FIGS. 1 and 3 can be implemented by special purpose hardware-based computer systems which perform the operations, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of predicting a fault comprising:
   providing a plurality of features to a plurality of models;
   performing feature selection, wherein a plurality of selected features provided to a first model differs from a plurality of selected features provided to a second model, wherein the plurality of selected features provided to a respective model is associated with a time within a respective time scale associated with the respective model, and wherein the time scale associated with at least one of the plurality of models is different than the time scale associated with another one of the plurality of models;
   processing the respective plurality of selected features with the plurality of models; and
   fusing outputs from the plurality of models to generate a measure indicative of an impending fault.

2. A method according to claim 1 wherein the plurality of models comprise a plurality of different types of mathematical models.

3. A method according to claim 1 further comprises training a common mathematical model with different data to generate the plurality of models.

4. A method according to claim 3 wherein training the common mathematical model with different data comprises training the common mathematical model with data from the different time scales to generate the plurality of models associated with different respective time scales.

5. A method according to claim 1 wherein performing feature selection comprises selecting features that are dependent upon both parametric and nonparametric data.

6. A method according to claim 1 further comprising providing a plurality of models associated with a common time scale, wherein providing the plurality of selected features comprises providing a plurality of features to each of the plurality of models associated with the common time scale.

7. A method according to claim 6 wherein performing feature selection comprises providing a different plurality of selected features to a plurality of models associated with the common time scale.

8. A method according to claim 1 wherein fusing the outputs comprises fusing the outputs from the plurality of models to generate a measure indicative of an impending fault within at least one of an aircraft engine or a gas turbine.

9. An apparatus for predicting a fault comprising:
a processing element configured to provide a plurality of features to a plurality of models, said processing element also configured to perform feature selection, wherein a plurality of selected features provided to a first model differs from a plurality of selected features provided to a second model, wherein the plurality of selected features provided to a respective model is associated with a time within a respective time scale associated with the respective model, and wherein the time scale associated with at least one of the plurality of models is different than the time scale associated with another one of the plurality of models, said processing element also configured to process the respective plurality of selected features with the plurality of models, said processing element further configured to fuse outputs from the plurality of models to generate a measure indicative of an impending fault.

10. An apparatus according to claim 9 wherein the plurality of models comprise a plurality of different types of mathematical models.

11. An apparatus according to claim 9 wherein the plurality of models comprise a common mathematical model that has been trained with different data.

12. An apparatus according to claim 11 wherein the processing element is configured to train the common mathematical model with data from the different time scales to generate the plurality of models associated with different respective time scales.

13. An apparatus according to claim 9 wherein the processing element is configured to perform feature selection by selecting features that are dependent upon both parametric and nonparametric data.

14. An apparatus according to claim 9 wherein a plurality of models are associated with a common time scale, and wherein the processing element is configured to provide a plurality of selected features to each of the plurality of models associated with the common time scale.

15. An apparatus according to claim 9 wherein the processing element is configured to perform feature selection by providing a different plurality of selected features to a plurality of models associated with the common time scale.

16. An apparatus according to claim 9 wherein the processing element is further configured to fuse the outputs from the plurality of models to generate a measure indicative of an impending fault within at least one of an aircraft engine or a gas turbine.

17. A computer program product comprising at least one computer-readable storage medium having computer-readable program code portions stored therein, the computer-readable program code portions comprising: a first executable portion for providing a plurality of features to a plurality of models; a second executable portion for performing feature selection, wherein a plurality of selected features provided to a first model differs from a plurality of selected features provided to a second model, and wherein the plurality of selected features provided to a respective model is associated with a time within a respective time scale associated with the respective model, and wherein the time scale associated with at least one of the plurality of models is different than the time scale associated with another one of the plurality of models; a third executable portion for processing the respective plurality of selected features with the plurality of models; and a fourth executable portion for fusing outputs from the plurality of models to generate a measure indicative of an impending fault.

18. A computer program product according to claim 17 wherein the plurality of models comprise a plurality of different types of mathematical models.

19. A computer program product according to claim 17 further comprising a fifth executable portion for training a common mathematical model with different data to generate the plurality of models.

20. A computer program product according to claim 19 wherein the fifth executable portion is configured to train the common mathematical model with data from the different time scales to generate the plurality of models associated with different respective time scales.

21. A computer program product according to claim 17 wherein the second executable portion is configured to perform feature selection by selecting features that are dependent upon both parametric and nonparametric data.

22. A computer program product according to claim 17 wherein a plurality of models are associated with a common time scale, and wherein the first executable portion is configured to provide a plurality of features to each of the plurality of models associated with the common time scale.

23. A computer program product according to claim 17 wherein the first executable portion is configured to provide a different plurality of selected features to a plurality of models associated with the common time scale.

24. A computer program product according to claim 17 wherein the fourth executable portion is further configured to fuse the outputs from the plurality of models to generate a measure indicative of an impending fault within at least one of an aircraft engine or a gas turbine.

25. A method according to claim 1 wherein the time scale associated with each of the plurality of models concludes at a same time, and wherein the time scale associated with at least one of the plurality of models begins at a different time than the time scale associated with another one of the plurality of models.

26. A method according to claim 1 wherein performing feature selection comprises providing a combination of features to a respective model that are most indicative of an impending fault when considered over the respective time scale.

27. An apparatus according to claim 9 wherein the time scale associated with each of the plurality of models concludes at a same time, and wherein the time scale associated with at least one of the plurality of models begins at a different time than the time scale associated with another one of the plurality of models.

28. An apparatus according to claim 9 wherein the processing element is configured to perform feature selection by providing a combination of features to a respective model that are most indicative of an impending fault when considered over the respective time scale.

29. A computer program product according to claim 17 wherein the time scale associated with each of the plurality of models concludes at a same time, and wherein the time scale associated with at least one of the plurality of models begins at a different time than the time scale associated with another one of the plurality of models.

30. A computer program product according to claim 17 wherein performing feature selection comprises providing a combination of features to a respective model that are most indicative of an impending fault when considered over the respective time scale.

* * * * *